(12) United States Patent
Henricksen

(10) Patent No.: US 10,926,753 B2
(45) Date of Patent: *Feb. 23, 2021

(54) OPPOSED HIGH PRESSURE HYDRAULIC SYSTEM

(71) Applicant: RG3 INPROP, LLC, Anaheim, CA (US)

(72) Inventor: Robert W. Henricksen, Anaheim, CA (US)

(73) Assignee: RG3 INPROP, LLC, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,563

(22) Filed: Aug. 13, 2018

(65) Prior Publication Data

US 2019/0225208 A1   Jul. 25, 2019

Related U.S. Application Data

(63) Continuation of application No. 15/008,246, filed on Jan. 27, 2016, now Pat. No. 10,046,747, which is a continuation of application No. 14/158,642, filed on Jan. 17, 2014, now abandoned, which is a continuation of application No. 12/914,879, filed on Oct. 28, 2010, now Pat. No. 8,631,914.

(60) Provisional application No. 61/293,092, filed on Jan. 7, 2010, provisional application No. 61/256,217, filed on Oct. 29, 2009.

(51) Int. Cl.
*B60T 17/22* (2006.01)
*F16D 48/04* (2006.01)
*F16D 48/02* (2006.01)
*B60T 11/16* (2006.01)
*B60T 13/14* (2006.01)
*F16D 65/28* (2006.01)

(52) U.S. Cl.
CPC .......... *B60T 17/221* (2013.01); *B60T 11/165* (2013.01); *B60T 13/142* (2013.01); *B60T 17/222* (2013.01); *F16D 48/02* (2013.01); *F16D 48/04* (2013.01); *F16D 65/28* (2013.01); *F16D 2048/0212* (2013.01)

(58) Field of Classification Search
CPC ...... B60T 17/10; B60T 17/221; B60T 17/222; B60T 13/142; B60T 11/165; F16D 48/02; F16D 48/04; F16D 65/28; F16D 2048/0212

See application file for complete search history.

(56) References Cited

U.S. PATENT DOCUMENTS 2,540,879 A * 2/1951 Hebel ................. F15B 7/10
60/572
3,520,385 A * 7/1970 Beckman ............ F16D 65/18
188/345

(Continued)

*Primary Examiner* — Xuan Lan Nguyen
(74) *Attorney, Agent, or Firm* — Knobbe, Martens, Olson & Bear, LLP

(57) ABSTRACT

Braking systems and methods having above atmospheric pressure applied to the working hydraulic fluid of the braking system. In certain preferred arrangements, the braking system includes at least one source of pressure, which pressurizes a fluid. The pressurized fluid acts on respective pressure surfaces of the master plunger(s) and the slave piston(s) that are opposite the active or working surfaces of the master plunger(s) and the slave piston(s).

6 Claims, 13 Drawing Sheets

(56) References Cited

U.S. PATENT DOCUMENTS

| | | | | |
|---|---|---|---|---|
| 3,540,482 A * | 11/1970 | Fulmer | F15B 1/18 138/30 |
| 3,579,989 A * | 5/1971 | Stark | F15B 7/001 60/567 |
| 3,613,839 A * | 10/1971 | MacDuff | B60T 11/10 188/160 |
| 3,944,027 A * | 3/1976 | Yamamoto | F16D 65/18 188/71.9 |
| 3,967,447 A * | 7/1976 | Hegel | F15B 7/10 60/572 |
| 4,030,577 A * | 6/1977 | Ogawa | F16D 65/16 188/71.9 |
| 4,373,614 A * | 2/1983 | Runkle | F16D 55/224 188/196 P |
| 4,619,348 A * | 10/1986 | Smith | B60T 13/406 188/153 R |
| 4,638,894 A * | 1/1987 | Sitabkhan | B66D 5/14 188/170 |
| 4,716,732 A * | 1/1988 | Tordoff | B60T 11/30 60/546 |
| 4,776,641 A * | 10/1988 | Bulling | B60T 11/18 188/264 R |
| 4,785,918 A * | 11/1988 | Biamino | F16D 65/14 188/72.4 |
| 4,866,937 A * | 9/1989 | Leigh-Monstevens | F15B 7/005 60/572 |
| 5,058,385 A * | 10/1991 | Everett, Jr. | F15B 11/076 60/571 |
| 5,161,449 A * | 11/1992 | Everett, Jr. | F15B 11/0725 60/562 |
| 5,334,062 A * | 8/1994 | Lurbiecki | B63H 21/213 440/86 |
| 5,924,285 A * | 7/1999 | Chiba | G01F 23/62 60/585 |
| 6,378,664 B1 * | 4/2002 | Warwick | F16D 65/18 188/72.3 |
| 6,996,985 B2 * | 2/2006 | Bornkessel | B60T 11/16 60/585 |
| 7,431,131 B1 * | 10/2008 | Chevalier | B60T 7/06 188/72.1 |

* cited by examiner

OPPOSED HIGH PRESSURE HYDRAULIC SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference herein and made a part of the present disclosure.

BACKGROUND

Field

The present invention is directed generally toward hydraulic systems, such as vehicular and non-vehicular brake systems. In particular, the present invention is directed toward a hydraulic system in which above-atmospheric pressure is applied to the working fluid of the hydraulic system.

Description of Related Art

Many types of hydraulic systems, such as braking systems for vehicular and non-vehicular applications, exist. Such systems may include features to reduce required operator input forces, such as power boosters, and to enhance performance, such as anti-lock systems. However, a need exists for continued improvement of existing brake systems, including for applications in which excessive heat is generated and transferred to the working hydraulic fluid of the brake system.

SUMMARY

One or more preferred embodiments of the present invention control and raise the boiling point of a hydraulic fluid, such as a vehicle's brake fluid. Benefits of the embodiments of the invention may include, but are not limited to; the maintaining of braking feel consistency and performance to the operator due to pressurization of the fluid, to reduce the ill effects of aerated or emulsified brake fluid caused by a system exposed to extremes of internal system pressures and heat, to greatly reduce the ill effects of moisture and heat on brake performance such as brake fade, failure and inconsistency.

Relevant rolling vehicles may consist of any wheeled or non-wheeled (e.g., track driven) structure that when in motion requires a hydraulic brake system to control the speed of its motion. Relevant rolling vehicles that would benefit from a system of this design include automobiles, motorcycles, all terrain vehicles, heavy moving equipment, trains and aircraft. Embodiments of the invention may also be suitable or adaptable for use in other hydraulic systems, including non-vehicular applications.

Some preferred embodiments of the present invention utilize preferably a single pressure chamber that applies pressure to a captured hydraulic brake fluid system from opposing ends, working independently of the existing pressures introduced mechanically to activate the brakes. The pressure chamber may be comprised of a rubber bladder of gas, the membrane character of which separates the gas and fluid atmospheres, or metal (e.g. aluminum) moving pistons or moving pistons constructed from another suitable material or combination of materials, their structure and circumferential sealing and sliding surfaces providing atmospheric separation. Ceramic or similar coatings may be applied to surfaces to reduce heat absorption into gas atmospheres. Springs may be utilized in place of gas to provide the compressible, pressurizing entities.

Certain preferred embodiments of the present invention involve braking systems having above atmospheric pressure applied to the working hydraulic fluid of the braking system, such as any of the systems described below. Preferred embodiments also include vehicles incorporating such braking systems and methods for manufacturing and using such braking systems. In some preferred arrangements, the braking system includes at least one source of pressure, which pressurizes a fluid. The pressurized fluid acts on respective pressure surfaces of the master plunger(s) and the slave piston(s) that are opposite the active or working surfaces of the master plunger(s) and the slave piston(s).

A preferred embodiment involves a pressurized brake system having a master cylinder at least partially defining a master chamber. A master plunger slides within the master cylinder and includes an active face facing the master chamber and a pressure face opposite the active face. A slave cylinder at least partially defines a slave chamber. A slave piston slides within the slave cylinder and includes an active face facing the slave chamber and a pressure face opposite the active face. The master chamber is in fluid communication with the slave chamber such that movement of the master plunger results in hydraulic movement of the slave piston. Fluid pressure from at least one pressure chamber acts on the pressure face of the master plunger and the pressure face of the slave piston.

In some arrangements, the at least one pressure chamber is a single pressure chamber. In some arrangements, the at least one pressure chamber includes at least a first pressure chamber and a second pressure chamber, wherein pressure from the first pressure chamber acts on the pressure face of the master plunger and pressure from the second pressure chamber acts on the pressure face of the slave piston.

In some arrangements, the brake system includes a master reservoir housing at least partially defining a master reservoir chamber. The master reservoir chamber is selectively put in fluid communication with the master chamber. In some arrangements, a movable wall is positioned between the at least one pressure chamber and the master reservoir chamber such that pressure from the at least one pressure chamber acts on the master reservoir chamber.

In some arrangements, the master plunger includes a first portion and a second portion that are movable relative to one another. A compensation chamber is defined between the first portion and the second portion and is in fluid communication with the at least one pressure chamber.

In some arrangements, the brake system includes at least one gas chamber containing a pressurized gas. Pressure from the at least one gas chamber acts on the at least one pressure chamber. A valve can communicate with the at least one gas chamber to permit a pressure of the pressurized gas to be adjusted.

A preferred embodiment involves a vehicle having a vehicle body, at least one ground-contacting element configured to propel the vehicle along the ground and a brake system. The brake system includes at least one braking mechanism configured to slow or stop the ground-contacting element. The brake system includes a master cylinder at least partially defining a master chamber. A master plunger slides within the master cylinder and includes a working face facing the master chamber and a pressure face opposite the working face. At least one slave cylinder at least partially defines a slave chamber. At least one slave piston slides within the at least one slave cylinder and includes a working face facing the slave chamber and a pressure face opposite the working face. The master chamber is in fluid communication with the slave chamber such that movement of the master plunger results in hydraulic movement of the at least one slave piston. Fluid pressure from at least one pressure chamber acts on the pressure face of the master plunger and the pressure face of the at least one slave piston.

In some arrangements, the at least one pressure chamber in the brake system of the vehicle is a single pressure chamber. In some arrangements, the at least one pressure chamber includes at least a first pressure chamber and a second pressure chamber. Pressure from the first pressure chamber acts on the pressure face of the master plunger and pressure from the second pressure chamber acts on the pressure face of the at least one slave piston.

In some arrangements, the brake system of the vehicle includes a master reservoir housing at least partially defining a master reservoir chamber. The master reservoir chamber is selectively put in fluid communication with the master chamber. In some arrangements, a movable wall is positioned between the at least one pressure chamber and the master reservoir chamber such that pressure from the at least one pressure chamber acts on the master reservoir chamber.

In some arrangements, the master plunger of the vehicle brake system includes a first portion and a second portion that are movable relative to one another. A compensation chamber is defined between the first portion and the second portion and is in fluid communication with the at least one pressure chamber.

In some arrangements, the vehicle brake system includes at least one gas chamber containing a pressurized gas. Pressure from the at least one gas chamber acts on the at least one pressure chamber. In some arrangements, a valve communicates with the at least one gas chamber to permit a pressure of the pressurized gas to be adjusted.

A preferred embodiment involves a method of braking a vehicle. The method includes applying a user-initiated force to a master plunger to move the master plunger within a master cylinder such that a slave piston is moved within a slave cylinder via transfer of the force through a working hydraulic fluid while a source of pressurized fluid applies a pressure to surfaces of the master plunger and slave piston on opposite sides of the working hydraulic fluid. The method further includes releasing the user-initiated force thereby allowing return movement of the master plunger and slave piston while the source of pressurized fluid maintains the pressure on the surfaces of the master plunger and slave piston on opposite sides of the working hydraulic fluid.

BRIEF DESCRIPTION OF THE DRAWINGS

These and other features aspects and advantages of the present opposed, high pressure brake system are described below with reference to drawings of preferred embodiments, which are intended to illustrate and not to limit the invention.

DETAILED DESCRIPTION

Figure 1:
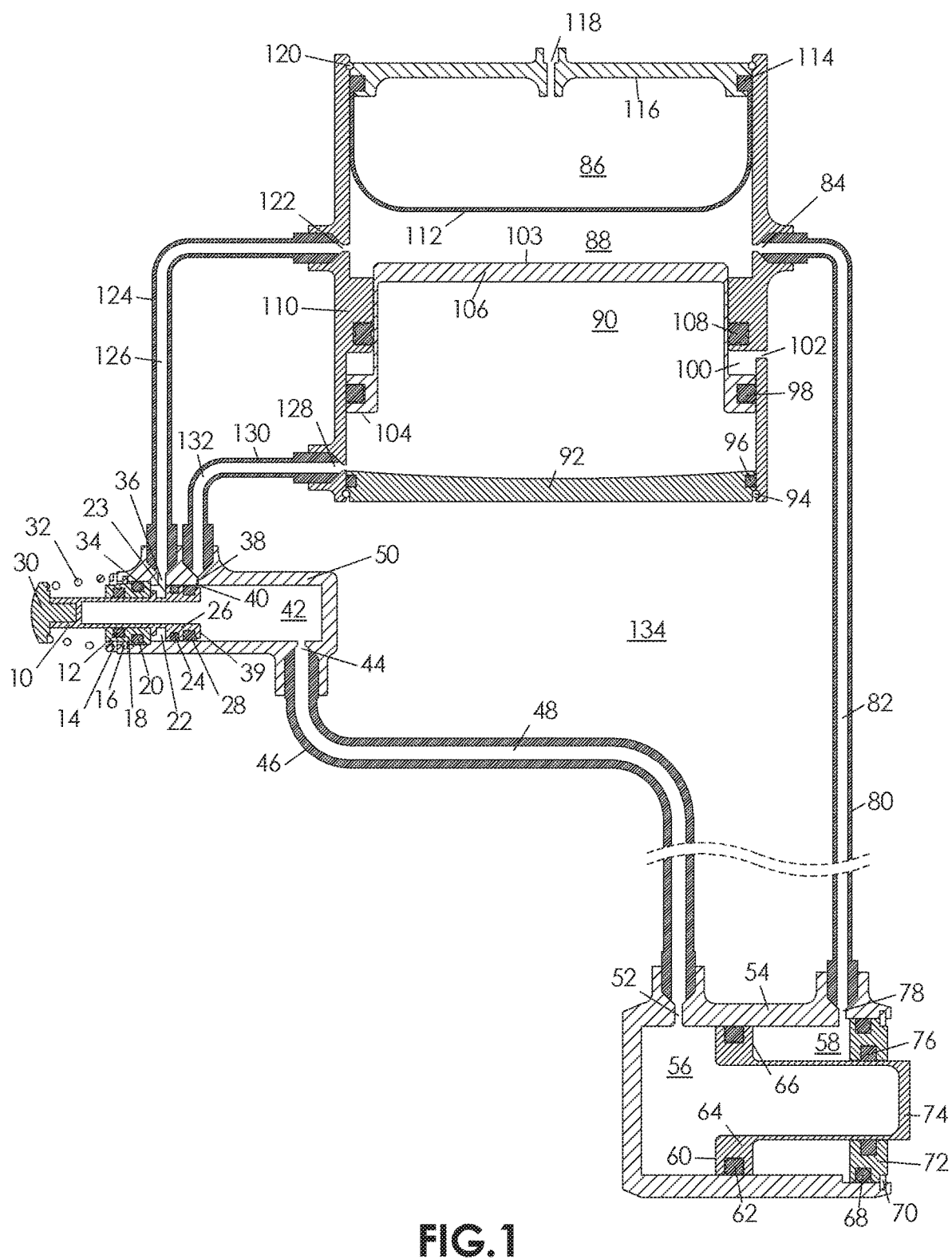
FIG. 1 shows a cutaway view of the assembled system in its retracted and starting position.

Preferred embodiments of the present invention involve hydraulic systems, such as braking systems, having above atmospheric pressure applied to the working hydraulic fluid of the system. Preferred embodiments also include vehicles incorporating such braking systems and methods for manufacturing and using such braking systems. In some preferred arrangements, the braking system includes at least one source of pressure, which pressurizes a fluid. The pressurized fluid acts on respective pressure surfaces of the master plunger(s) and the slave piston(s) that are opposite the active or working surfaces of the master plunger(s) and the slave piston(s).

The inventive hydraulic systems may be employed on any vehicle or other machine in which it is desired to reduce the speed, or prevent relative motion, of one component of the machine relative to another. That is, the braking systems can be employed in vehicular or non-vehicular applications. Vehicular applications may include wheeled vehicles (e.g., motorcycles, automobiles, aircraft or trains) or non-wheeled vehicles (e.g., tracked vehicles such as snowmobiles, tanks or bulldozers). Preferred embodiments may be employed in any type of hydraulic system, including non-braking applications. For example, the inventive systems may be applied to hydraulic clutch systems in vehicular or non-vehicular applications, as well as other types of hydraulic systems.

The inventive systems are well-suited for use in demanding applications in which hydraulic or braking forces are large and/or of an extended duration. Such applications tend to cause significant heating of the working hydraulic or brake fluid when the hydraulic or brake system is activated. In atmospheric or non-pressurized hydraulic or braking systems, the working fluid can exceed its boiling temperature when the hydraulic or braking system is released, causing an undesirable degradation in performance or loss of functionality upon reactivation of the hydraulic or braking system. The inventive systems can reduce or eliminate the degradation in performance or loss of functionality in many or all applications and environments.

As will be appreciated by those skilled in the art, features, aspects and advantages of the present invention are described below with reference to certain preferred embodiments and examples. Some of these embodiments and examples illustrate the basic components of the inventive systems without illustrating all of the related components and features of the particular vehicle in which the system is employed. Various types of hydraulic systems and hydraulic braking systems are known and those skilled in the art will be capable of adapting the illustrated embodiments and arrangements for use in a desired vehicular or non-vehicular application, if necessary or desirable. For example, the inventive systems can be employed in a disc brake application or a drum brake application, among others. The embodiments illustrated and described below are directed toward disc brake vehicular applications, which may include single piston and multiple piston arrangements, as well as floating caliper and fixed caliper arrangements. Well-known, common elements, such as a brake pedal (or lever) actuator, power boosters, electronic and hydraulic control systems, disc pads/calipers, and vehicle wheels/tires are not shown for the sake of simplicity. Moreover, it is well within the ability of those skilled in the art to implement the inventive system in a power-assisted or anti-lock braking system, for example. Well-known components and arrangements of such systems are considered to be within the scope of the present inventions.

Figure 2:
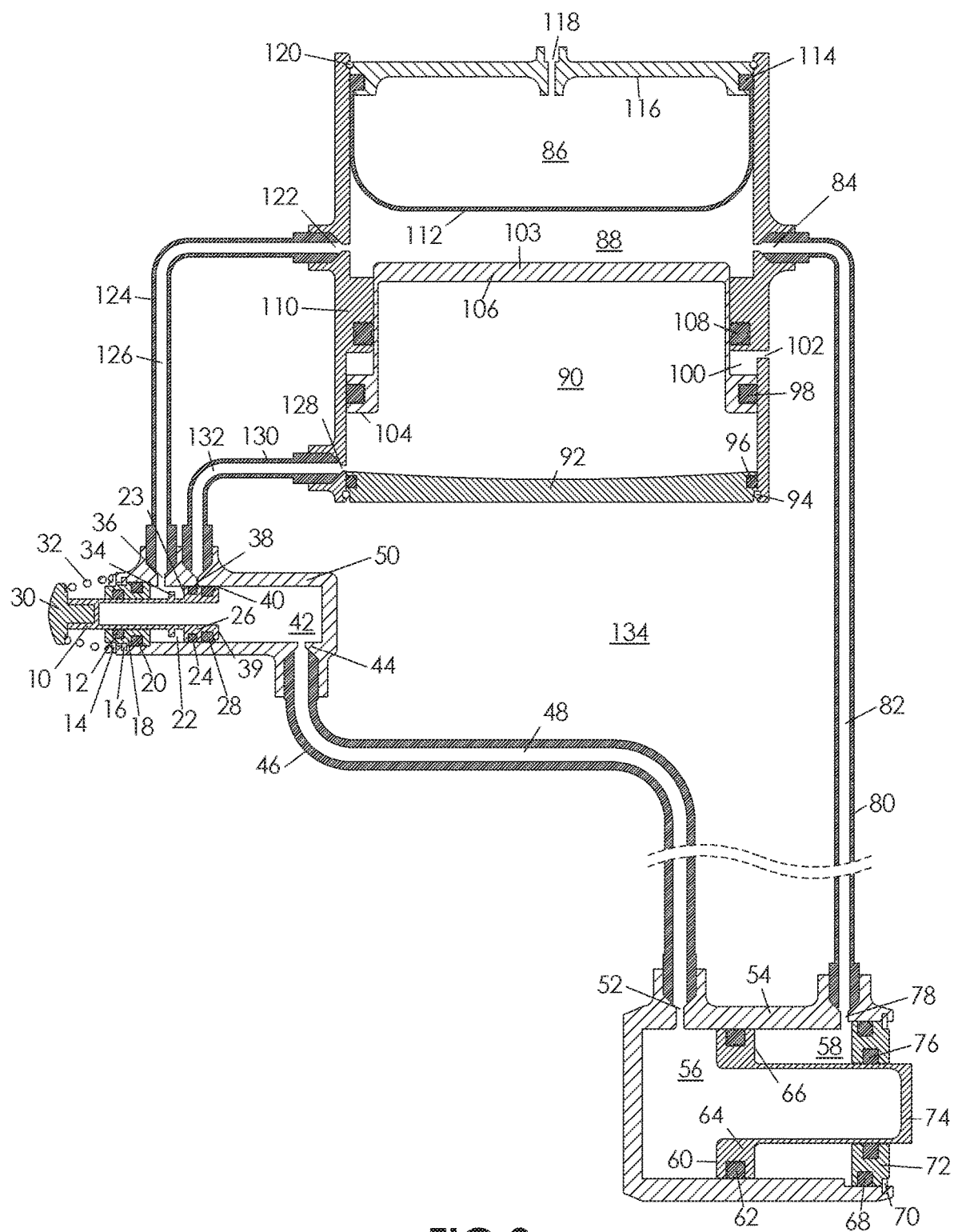
FIG. 2 shows a cutaway view of the assembled system in its activated form.
Figure 3:
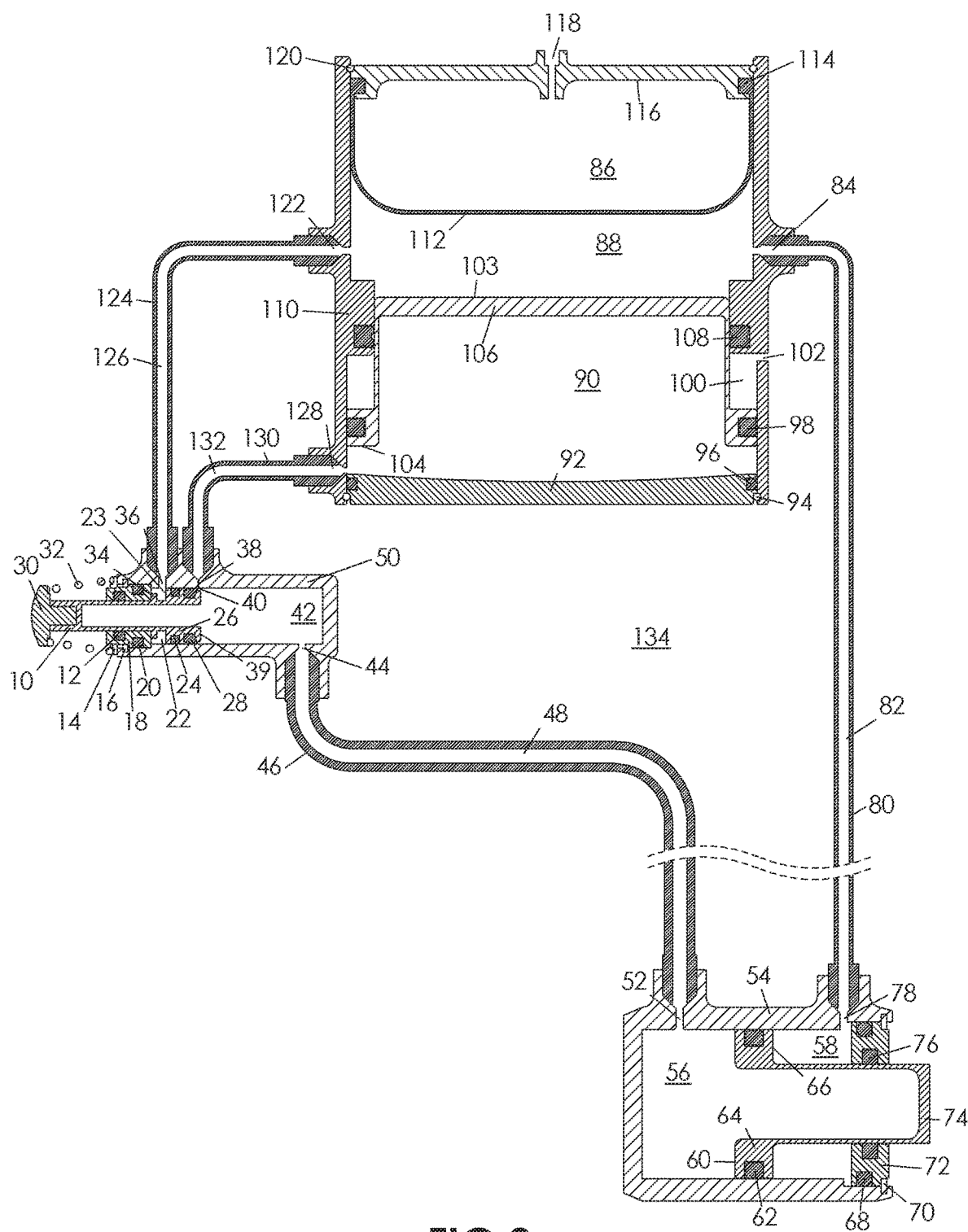
FIG. 3 shows a cutaway view of the assembled system in a reloaded position with the master plunger retracted, the slave piston extended from the slave cylinder due to normal brake pad wear, and the pressure reduction piston repositioned to accommodate fluid volume replenishment.

FIGS. 1-3 illustrate one preferred embodiment of a braking system in various positions or operational states. FIG. 1 shows a master plunger 10 positioned within and axially movable relative to a master cylinder 50. The master plunger 10 may be actuated directly or indirectly by any suitable actuation device, system or arrangement (not shown), such as by a lever or pedal arrangement, for example. The master plunger 10 is formed with a master plunger head 26 that is larger in diameter than a shaft portion of the plunger 10 to create a primary chamber 22 on one side and a master chamber 42 on the other. Preferably, sealing between the primary chamber 22 and the master chamber 42 is achieved by a cup seal 28 and a high pressure seal 24. However, other suitable seals or sealing arrangements may be used in the place of the seals 24 and 28 or any of the other various seals/sealing arrangements described below. On the side of the primary chamber 22, the master plunger head 26 has an annular face 23.

Sealing the system to outside atmosphere 134 is the master plunger seal 12 and the seal-head seal 20 both housed by a seal-head 18 and retained within the master cylinder 50 by a suitable retention mechanism, such as a cir-clip 16. Retraction of the master plunger 10 is aided by biasing element, such as a return spring 32, which preferably is held in place by a retaining plug 30. The illustrated return spring 32 is seated on a circular spring seat 14 against the master cylinder 50.

In the static start position as shown, the fluid within the master chamber 42 communicates through an orifice 44 into the brake line 46 and through the brake line center 48 through an orifice 52 into the slave chamber 56 of the slave cylinder 54. Housed axially within the slave cylinder 54 is the slave piston 74, which has a slave piston head 64 separating the slave chamber 56 from the secondary chamber 58. The slave piston 74 preferably applies a force to a brake friction pad (in a disc brake application), shoe (in a drum brake application), or another suitable braking element. The brake pad or shoe frictionally engage a rotor or drum to reduce the speed of the rotor or drum and corresponding element, such as the vehicle wheel. A seal 62 is housed circumferentially around the slave piston head 64 to seal the secondary chamber 58 and slave chamber 56 from each other. A seal 76 and an o-ring 68 seal the secondary chamber 58 from the outside atmosphere 134 and are housed within a seal head 72. The seal head 72 is retained by a suitable retention mechanism, such as the employment of a cir-clip 70.

A master reservoir housing 110 can accommodate the system's replenishing fluid within a master reservoir 90. A high pressure gas chamber 86 is created within the capture of a separating wall or membrane 112 which exerts its pressure upon the pressure chamber 88. However, in other arrangements including the embodiments described below, the gas chamber (or chambers) 86 can act directly on the annular faces 23 and 66 of the master plunger 10 and slave piston(s) 74, respectively. The pressure chamber 88 in turn exerts pressure against a reduction piston 106 fitted and axially movable within the master reservoir housing 110. The reduction piston 106 separates the pressure chamber 88 from the master reservoir 90. Sealing the circumferences of the reduction piston 106 are seals 98 and 108. A retaining cap 116 contains the separating membrane 112 within the master reservoir housing 110 and is fitted axially into the master reservoir housing 110 and secured in place by a suitable retention mechanism, such as a cir-clip 120. The high pressure gas chamber 86 is pressurized through the employment of a suitable (e.g., one way) valve 118 (not detailed). The annular chamber 100 created between the reduction piston 106 and the master reservoir housing 110 preferably is vented to the outside atmosphere 134 through a vent orifice 102.

The master reservoir 90 is capped off by an end plug 92. The end plug 92 is sealed to the outside atmosphere 134 by a suitable seal, such as an o-ring 96, and is retained by a suitable retention mechanism, such as a cir-clip 94.

As the high pressure gas chamber 86 applies its pressure to the pressure chamber 88 it concurrently pressurizes three areas. The first (yet simultaneous) communication is to the reduction piston 106, to the master reservoir 90, which communicates through the orifice 128 to the master high pressure line 130 and through its center 132, through the refill orifice 38 and into the master chamber 42. Preferably, fluid communication through the refill orifice 38 is only possible in the start position of the master plunger 10 when the cup seal 28 exposes the refill orifice 38. Secondly (also simultaneously), directly from the pressure chamber 88 through the orifice 122 to the primary high pressure line 124 and through its center 126, through the orifice 36 to the primary chamber 22, where it exerts pressure ultimately to the annular face 23 of the master plunger head 26. Thirdly (and also simultaneously) from the pressure chamber 88 through the orifice 84 into the secondary high pressure line 80, through its center 82, through the orifice 78 and into the secondary chamber 58 where it exerts pressure to the annular face 66 of the slave piston head 64.

The pressures exerted to the annular faces 23 and 66 are identical or substantially identical, ignoring losses in the system. The force exerted through the master plunger head 26 creates an output pressure to the active face 39 preferably equal or substantially equal to that output pressure created through the slave piston head 64 to the active face 60. This is accomplished by the relative areas of the annular face 23 and annular face 66 and their respective head active face areas. Therefore identical pressures in the master chamber 42, the slave chamber 56 and the brake line 46 may be achieved. Slight mismatching of these output pressures may be desired for some applications and may be altered by area changes of either annular face and their respective head active face area ratios.

The pressure imposed upon the reduction piston 106 does so upon the face area 103 of the reduction piston 106. As the opposing side face 104 has an active area larger than the face area 103, a pressure reduction in the master reservoir 90 from the pressure chamber 88 is achieved and the pressure in the master reservoir 90 is intentionally matched to the brake line 46 pressure or a desired mismatch in pressures for additional tuning of slave piston's 74 return after deployment.

FIG. 2 shows the system in an actuated state where the master plunger 10 is pushed into the master cylinder 50 consuming volume in the master chamber 42. The cup seal 28 covers the refill orifice 38 with its leading edge 40 so communication can no longer occur between the master high pressure line 130 and the master chamber 42. Because the compression chamber 42 fluid is at least substantially a hydraulic solid, the reduced volume communicates through the orifice 44, through the brake line center 48, through the orifice 52 into the slave cylinder 54, pushing the fluid in the slave chamber 56 to actively impose pressure upon the slave piston 74 active face 60 thereby moving the slave piston 74 and pushing the brake pads (not shown). The volumes of the secondary chamber 58 and the primary chamber 22 are dynamically changing as movement of both master plunger 10 and slave piston 74 occur and may accommodate their fluid needs by their indirect communication with the pressure chamber 88.

FIG. 3 shows the system in a reloaded/start position after normal brake wear and where the return spring 32 has pushed upon the retaining plug 30 to draw the master plunger 10 until its extension stop 34 is against the master cylinder 50 thereby limiting further extension. The return spring 32 is retained by the retaining plug 30 which is attached to the master plunger 10 and is located against the master cylinder 50 by a location plate. The refill orifice 38 is exposed and communication may occur between the master chamber 42 and the master high pressure line 130. When the slave piston 74 extends with normal brake wear, as shown, the volume between the active face 60 and active face 39 is increased. The exposing of the refill orifice 38 allows fluid to refill the master chamber 42 fulfilling the fluid volume needs of the system.

The volume in the master reservoir 90 will decrease proportionate to the required volume within the system and the reduction piston 106 will move to allow for this volume change. The movement of the reduction piston 106 will typically be equal to the area of the active face 60 of the slave piston 74 multiplied by the distance traveled by the slave piston 74 (fluid volume change with brake wear) divided by the active face area 104 of the reduction piston 106. An increase in volume occurs within the high pressure gas chamber 86 as the reduction piston 106 moves for fluid refill and a subsequent gas pressure decrease will occur. However, a volume decrease of the secondary chamber 58 occurs concurrently and this volume as fluid is introduced to the pressure chamber 88 offsetting some or all of the gas pressure decrease in the high pressure gas chamber 86 and may be accurately calculated knowing the pertinent areas and volumes.

Figure 4:
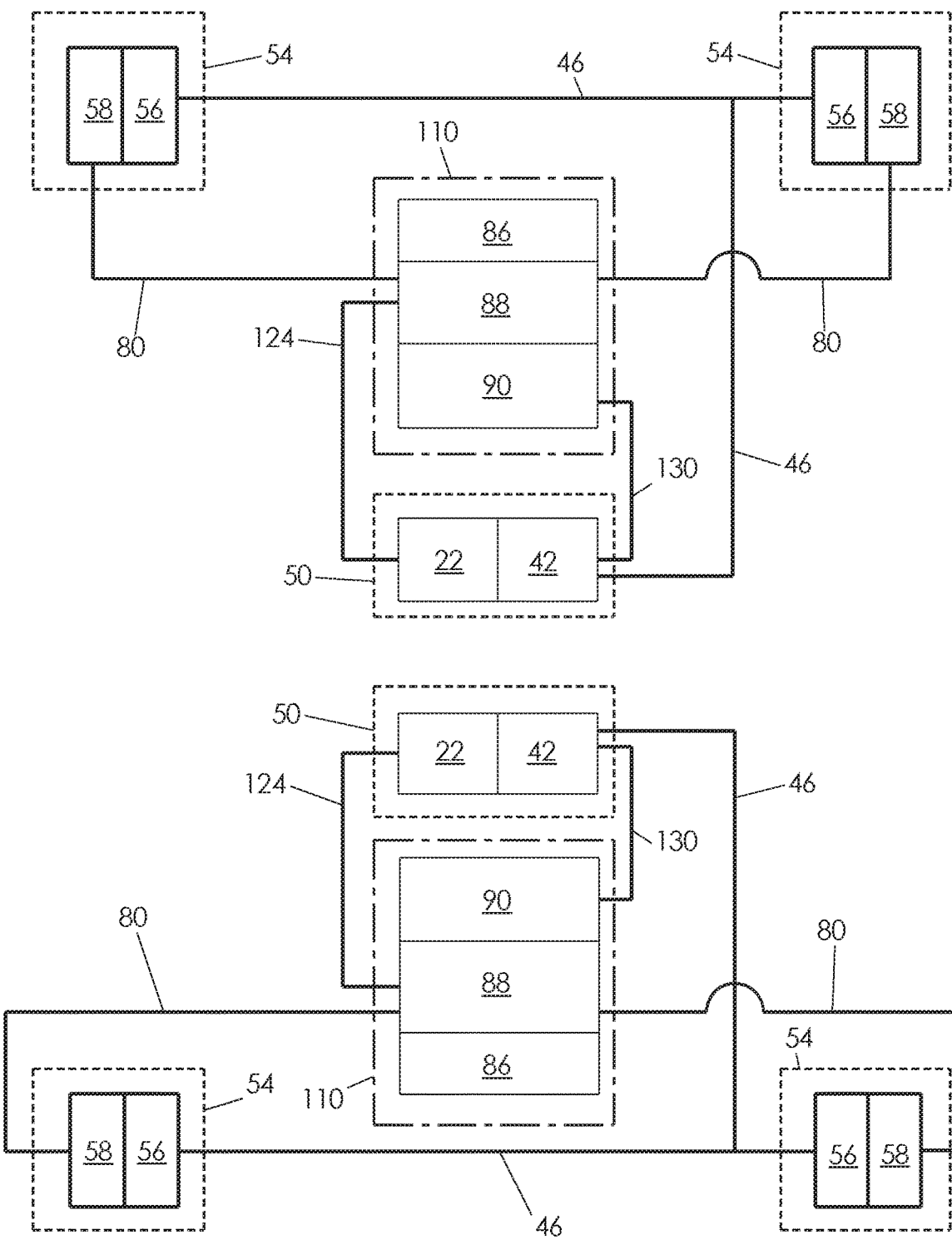
FIG. 4 is a block diagram showing the routing and placement of component parts of the preferred embodiment when fitted to a four wheeled vehicle utilizing front wheel and rear wheel isolated systems.

FIG. 4 shows a block diagram of a four wheeled vehicle with two master cylinders 50 housing primary chambers 22 and master chambers 42. The diagram also shows two master reservoir housings 110 incorporating high pressure chambers 86, pressure chambers 88 and master reservoirs 90. The master cylinders 50 may be in completely separate housings 110 or may be incorporated into a single housing (although still functionally separated), in accordance with a common vehicular arrangement. FIG. 4 also shows four slave cylinders 54, one at each corner of the vehicle and preferably corresponding with respective wheels (not shown) at each corner of the vehicle. The high pressure chambers 86 apply pressure to the pressure chambers 88 which in turn apply constant pressure via the primary high pressure lines 124 to the primary chambers and to the secondary chambers 58 in the slave cylinders 54 at each wheel (not shown) via the secondary high pressure lines 80. Preferably, pressure within the master reservoirs 90 communicates directly, via the master high pressure lines 130, to the master chambers 42 until the brake is actuated at which time the communication is mechanically impeded. When the brakes are deployed fluid is communicated via the brake lines 46 from the master chambers 42 to the slave chambers 56 thereby applying braking force. The areas of the faces of the master plunger 10, slave piston 74 and reduction piston 106 can be adjusted to accommodate each master cylinder 50 actuating two slave cylinders 54. That is, preferably the cumulative areas of the slave pistons 74 (or other duplicated components) are considered in balancing the ratio of the respective face areas.

Figure 5:
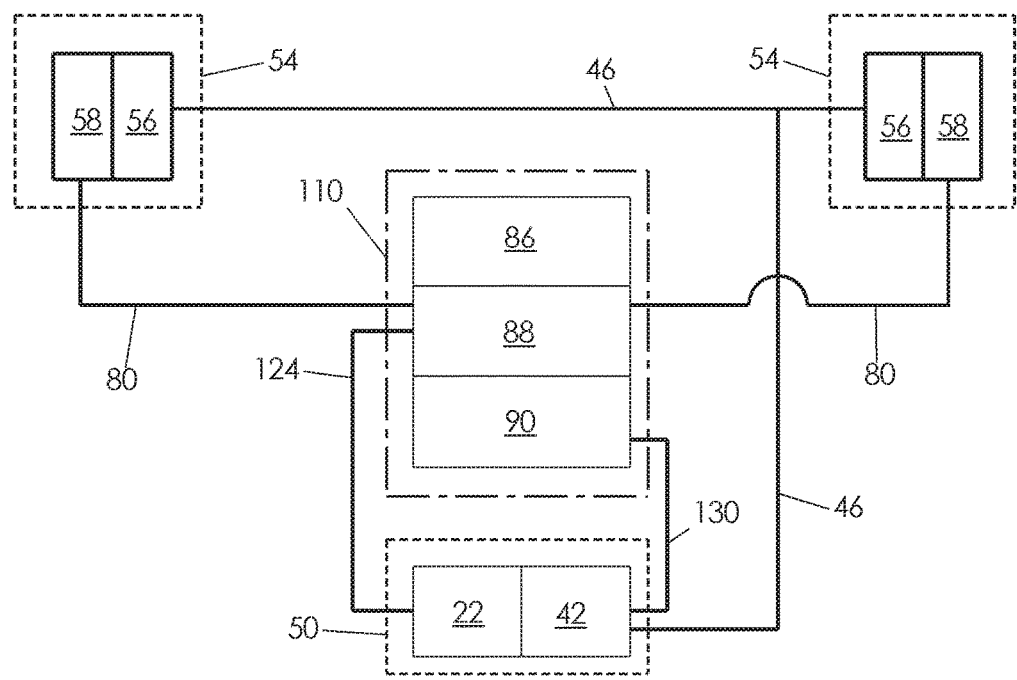
FIG. 5 is a block diagram showing the routing and placement of component parts of the preferred embodiment when fitted to a vehicle that utilizes more than the normal four wheel system.
Figure 5:
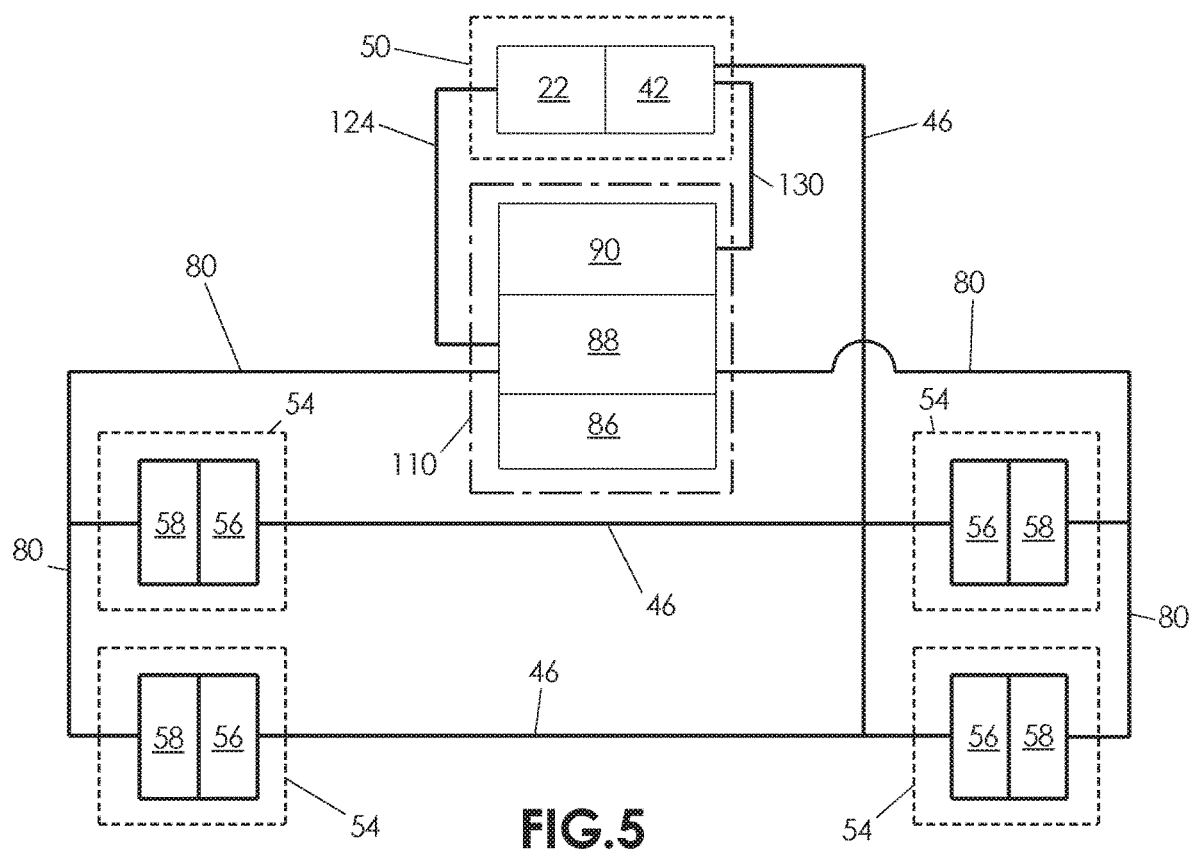

FIG. 5 illustrates a modification of the system shown in FIG. 4, which includes additional rear wheels (not shown) and the additional slave cylinders 54 that would be required and the routing between the additional slave cylinders 54 and the existing system of FIG. 4. The areas of the faces of the master plunger 10, slave piston 74 and reduction piston 106 can be adjusted to accommodate the cumulative areas resulting from each master cylinder 50 actuating two or four slave cylinders 54.

Figure 6:
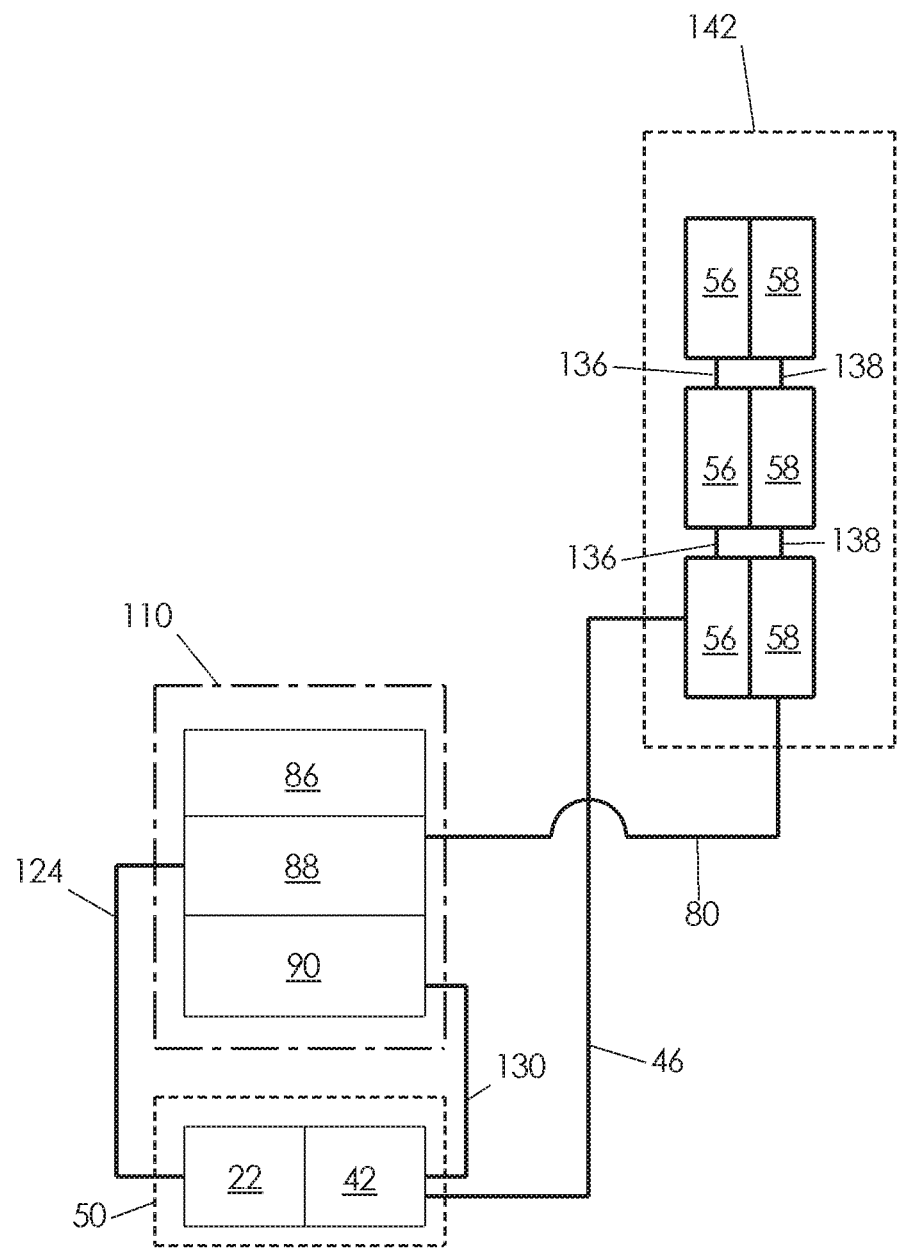
FIG. 6 is a block diagram showing the routing and placement of component parts of the preferred embodiment illustrating a multi piston caliper deployment.

FIG. 6 shows a portion of a modification of the system shown in FIG. 4 with one wheel caliper 142 singled out for illustration purposes as a multi slave piston system may be employed and the routing and relationship between component parts. The slave cylinder 54 houses multiple slave chambers 56 linked in series by communication lines 136 and multiple secondary chambers 58 linked in series by communication lines 138. The areas of the faces of the master plunger 10, slave pistons 74 and reduction piston 106 can be adjusted to accommodate the cumulative areas resulting from the multiple slave pistons.

Figure 7:
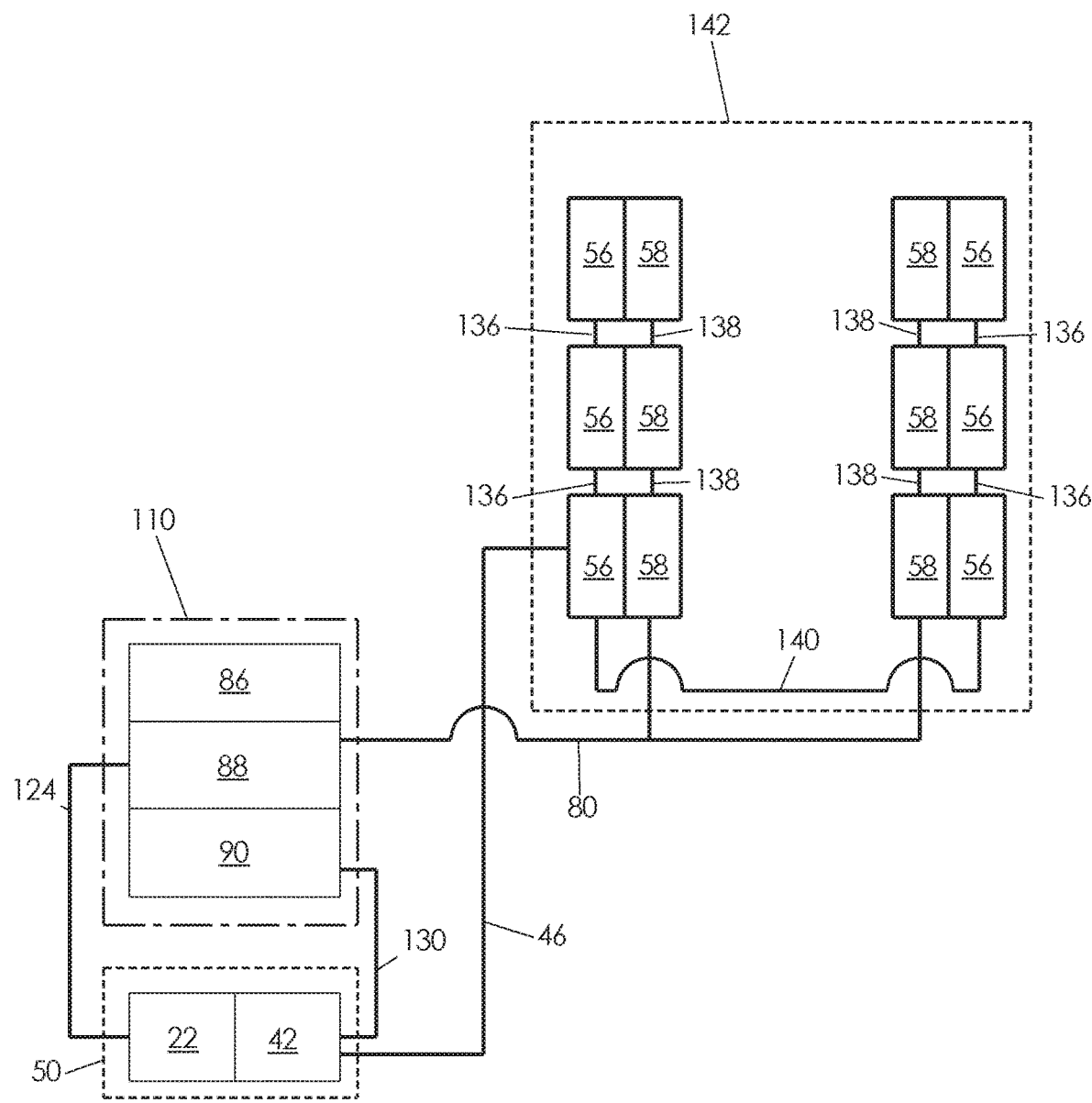
FIG. 7 is a block diagram showing the routing and placement of component parts of the preferred embodiment illustrating a multi opposed piston caliper deployment.

FIG. 7 shows a modification of the system illustrated in FIG. 6. The systems of FIGS. 1-6 were illustrated in the context of a floating caliper brake system in which the slave piston(s) is provided on one side of the brake rotor. FIG. 7 illustrates a system having a multi opposed piston (pistons not shown) layout within the wheel caliper 142. Additional high pressure lines 80 are employed to feed the series of secondary chambers 58 which are linked by the use of additional communication lines 138. A link line 140 is added to the second series of slave chambers 56 which are connected via communication lines 136 to activate the slave chambers 56 when the brakes are applied. As noted above, the areas of the faces of the master plunger 10, slave pistons 74 and reduction piston 106 can be adjusted to accommodate the cumulative areas resulting from the multiple slave pistons.

Figure 8:
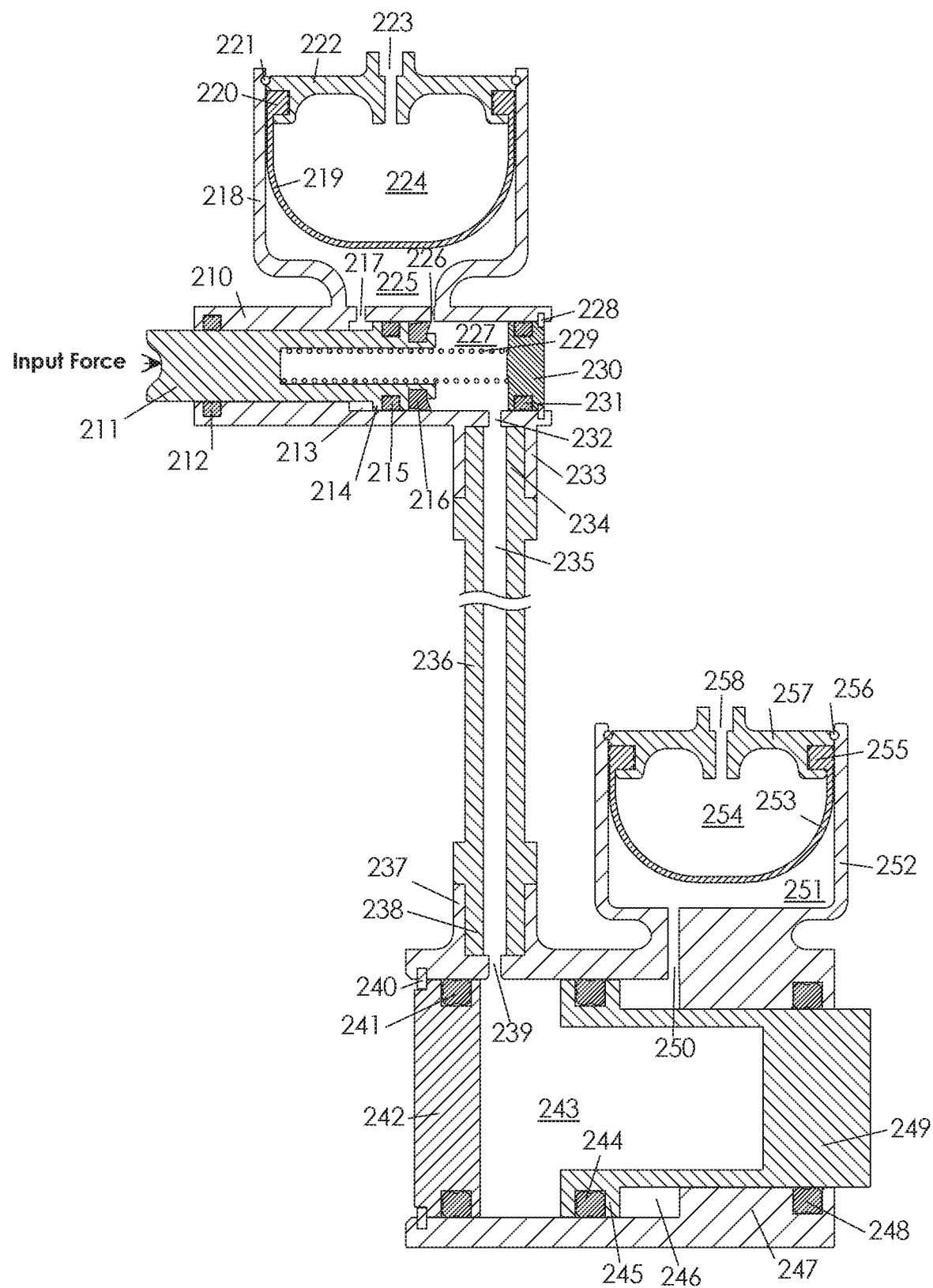
FIG. 8 shows a cutaway view of the assembled system in one of its simplest forms.
Figure 9:
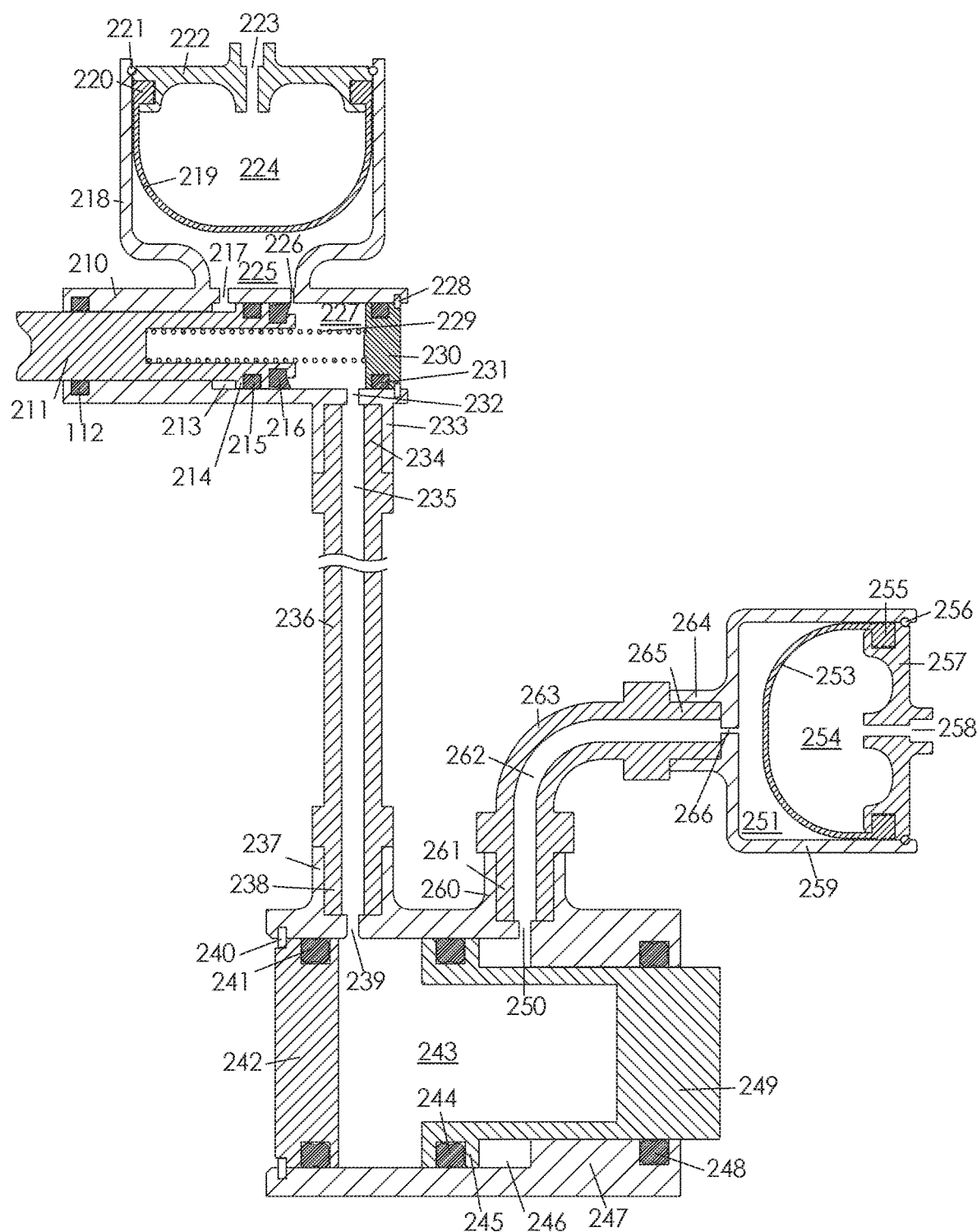
FIG. 9 shows a cutaway view of the assembled system employing a remote secondary reservoir.
Figure 10:
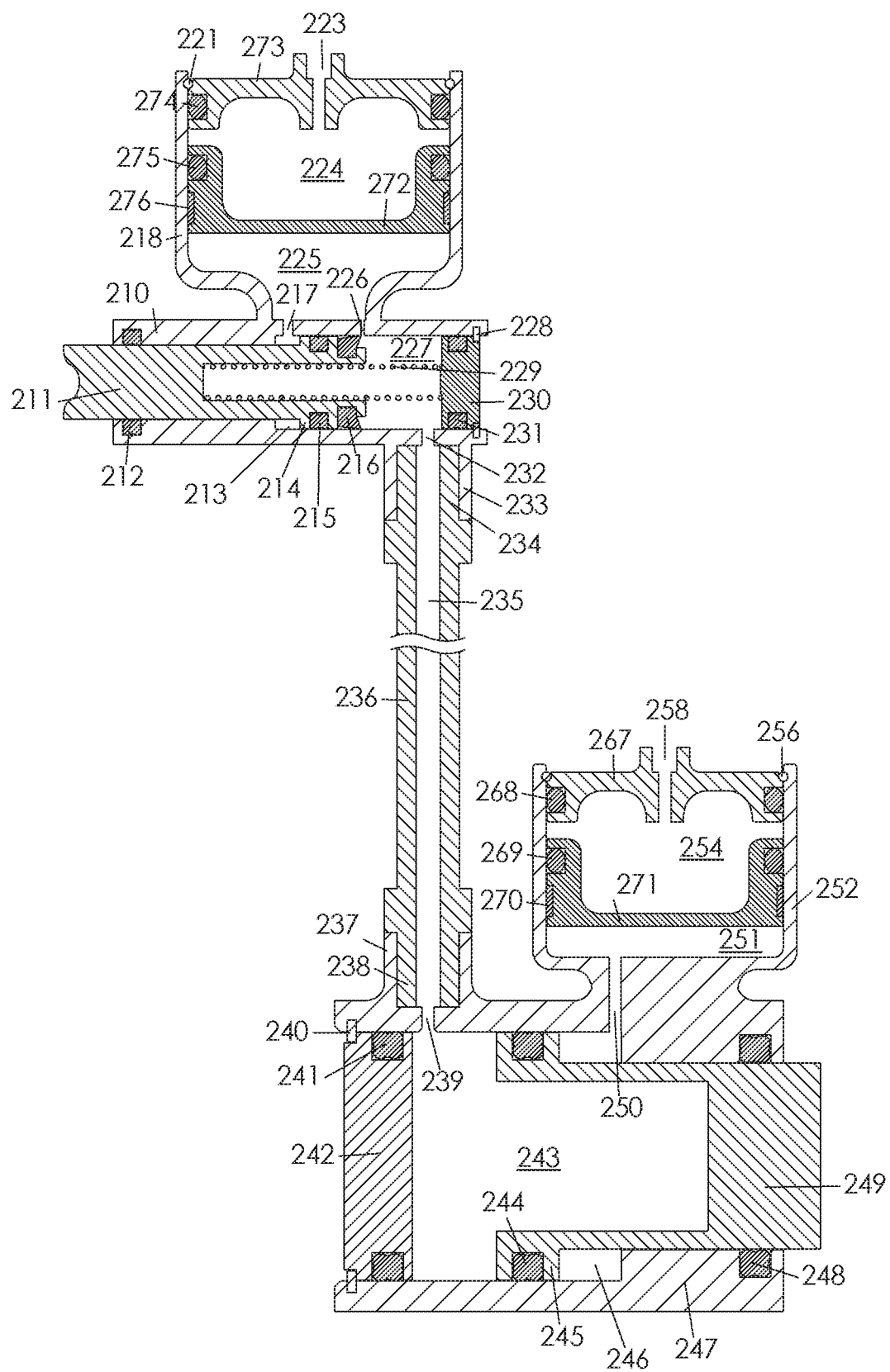
FIG. 10 shows a cutaway view of the assembled system employing dynamic pistons in the primary and secondary reservoirs.

FIGS. 8-10 illustrate modifications of the systems of FIGS. 1-7. In the systems of FIGS. 8-10, a multiple sources of fluid pressure are provided. Preferably, one source of pressure acts on the master plunger 211 and another, separate source of pressure acts on the slave piston 249. In particular, FIG. 8 shows a master cylinder body 210 with a master reservoir 218 attached. Positioned within the master reservoir 218 is a movable partition or wall or flexible (e.g., rubber) master bladder 219 that captures a high-pressure atmosphere 224 and pushes against a volume of brake fluid 225 within the master reservoir 218. A larger rim 220 on the master bladder 219 is captured within the confines of the master bladder cap 222 and seals the inner and outer circumferences of the master bladder larger rim 220 to the relative mating surfaces. The master bladder cap 222 is held in place by a suitable retention mechanism, such as a cir-clip 221. The master bladder 219 high-pressure atmosphere 224 is pressurized through the use of a suitable (e.g., one way) valve 223 (not detailed) through the master bladder cap 222. As the volume of fluid under pressure 225 within the master reservoir 218 will naturally migrate wherever it is able, it communicates to a primary chamber 213 created behind the master plunger head 214 through an orifice 217 and simultaneously to the master chamber 227 on the opposite side of the plunger head 214 through another orifice 226 of preferably minimal size.

The escape of fluid from the primary chamber 213 is controlled by the employment of a seal 212 to the outside atmosphere around the master plunger 211 and a seal 215 around the circumference of the master plunger head 214 to minimize or prevent direct communication to the master chamber 227.

A master cylinder plug 230 with seal 231 are placed into the master chamber 227 and held in place by a suitable retention mechanism, such as a cir-clip 228. The brake fluid within the master chamber 227 communicates through an orifice 232 in the master cylinder body 210 into the brake line center 235. The brake line 236 is attached to the master cylinder 210, such as by male 234 and female 233 threads, and to the slave cylinder body 247, such as by male 238 and female 237 threaded means. The brake fluid communicates from the brake line center 235 through an orifice 239 into the slave chamber 243. A slave cylinder plug 242 with a seal 241 is placed into the slave chamber 243 and held in place with a suitable retention mechanism, such as a cir-clip 240.

The slave cylinder body 247 with a slave reservoir 252 attached houses movable partition or wall or a flexible (e.g., rubber) slave bladder 253 that captures a high-pressure atmosphere 254 and pushes against a volume of brake fluid 251 within the slave reservoir 252. A larger rim 255 on the slave bladder 253 is captured within the confines of the slave bladder cap 257 and seals the inner and outer circumferences of the slave bladder larger rim 255 to the relative mating surfaces. The slave bladder cap 257 is held in place by a suitable retention mechanism, such as a cir-clip 256. The slave bladder 253 high-pressure atmosphere 254 is pressurized through the use of a suitable (e.g., one way) valve 258 through the slave bladder cap 257. The pressurized volume 251 of slave reservoir fluid communicates through an orifice 250 to the secondary chamber 246 behind the slave piston head 245. The secondary chamber 246 is sealed from the slave chamber 243 by a seal 244 and to the outside atmosphere by a seal 248.

During the actuation of the brakes the master plunger 211 is moved into the master chamber 227. The master plunger cup seal 216 covers the small orifice 226 from the master reservoir 218 and the master chamber 227 so communication can no longer take place between the entities. The (substantial or, at least, theoretical) hydraulic solid ahead of the master plunger cup seal 216 in the master chamber 227 is pushed through the orifice 232 in the master cylinder body 210, through the brake line center 235, the slave orifice 239 and into the slave chamber 243. The slave piston 249 is moved by the introduced volume to push the brake pads (not shown). A reduction of the captured volume in the secondary chamber 246 pushes its excess fluid through the orifice 250 into the slave reservoir 252 to collapse the slave bladder 253 proportionately. The pressures within the master bladder 219 and the slave bladder 253 are such that they are applying equal and opposite forces to their respective master plunger 211 and slave piston 249. The pressures in both may vary, depending on mechanical ratios required for the chosen application, to achieve the desirable opposing forces. For example, the pressures in the master bladder 219 and slave bladder 253 may be different than one another and, preferably, are related to the surface area of the respective piston 211, 249 on which the pressure acts. The pressures and/or surface areas may be adjusted such that equal and opposite forces acting on the pistons 211 and 249 are achieved. Releasing of brake actuation force on the master plunger 211 discontinues braking force and the master plunger 211 is returned to its fully extended position against a mechanical stop (not shown). The master plunger 211 is aided with its return by the employment of a return spring 229. Through the course of normal brake pad wear the volume within the system between the master plunger 211 and the slave piston 249 will increase. With the fully extended position of the master plunger 211, communication is reestablished through the small orifice 226 allowing fluid to freely pass between the high-pressure master reservoir 218 and the master chamber 227. This communication allows a small volume of fluid 225 to replenish the reduced fluid volume between the master plunger 211 and the slave piston 249.

FIG. 9 illustrates an embodiment with a remote reservoir 259 connected to a high-pressure hose 263 employing male 265 and female 264 threads or other suitable means of connection. The hose 263 is similarly attached to the slave cylinder body 247 using male 261 and female 260 threads or other suitable means of connection. The pressurized atmosphere 254 pushes on the slave bladder 253 to pressurize the fluid 251 within the remote slave reservoir 259 and communicates through an orifice 266, through the hose center 262, through an orifice 250 in the slave cylinder body 247 and ultimately to the secondary chamber 246.

FIG. 10 shows an embodiment of the system similar to the forms shown in FIG. 8 and FIG. 9 yet employs the use of a dynamic master piston 272 positioned within the master reservoir 218 with a seal 275 around its circumference to separate the high-pressure atmosphere 224 and the volume of brake fluid 225 within the master reservoir 218. Preferably, a guide bushing 276 around the circumference of the dynamic master piston 272 maintains alignment within the master reservoir 218. A master reservoir cap 273 is retained by a suitable retention mechanism, such as a cir-clip 221 and has a seal 274 about its circumference to substantially inhibit or disallow gas escape from the high-pressure atmosphere 224. The high-pressure atmosphere 224 is pressurized through the use of a suitable (e.g., one way) valve 223 (not detailed) through the master reservoir cap 273.

Within the slave reservoir 252, a dynamic slave piston 271 is positioned with a seal 269 around its circumference to separate the high-pressure atmosphere 254 and the volume of brake fluid 251 within the slave reservoir 252. Preferably, a guide bushing 270 around the circumference of the dynamic slave piston 271 maintains alignment within the slave reservoir 252. A slave reservoir cap 267 is retained by a cir-clip 256 and has a seal 268 about its circumference to substantially inhibit or disallow gas escape from the high-pressure atmosphere 254. The slave high-pressure atmosphere 254 is pressurized through the use of a suitable (e.g., one way) valve 258 (not detailed) through the slave reservoir cap 267.

Figure 11:
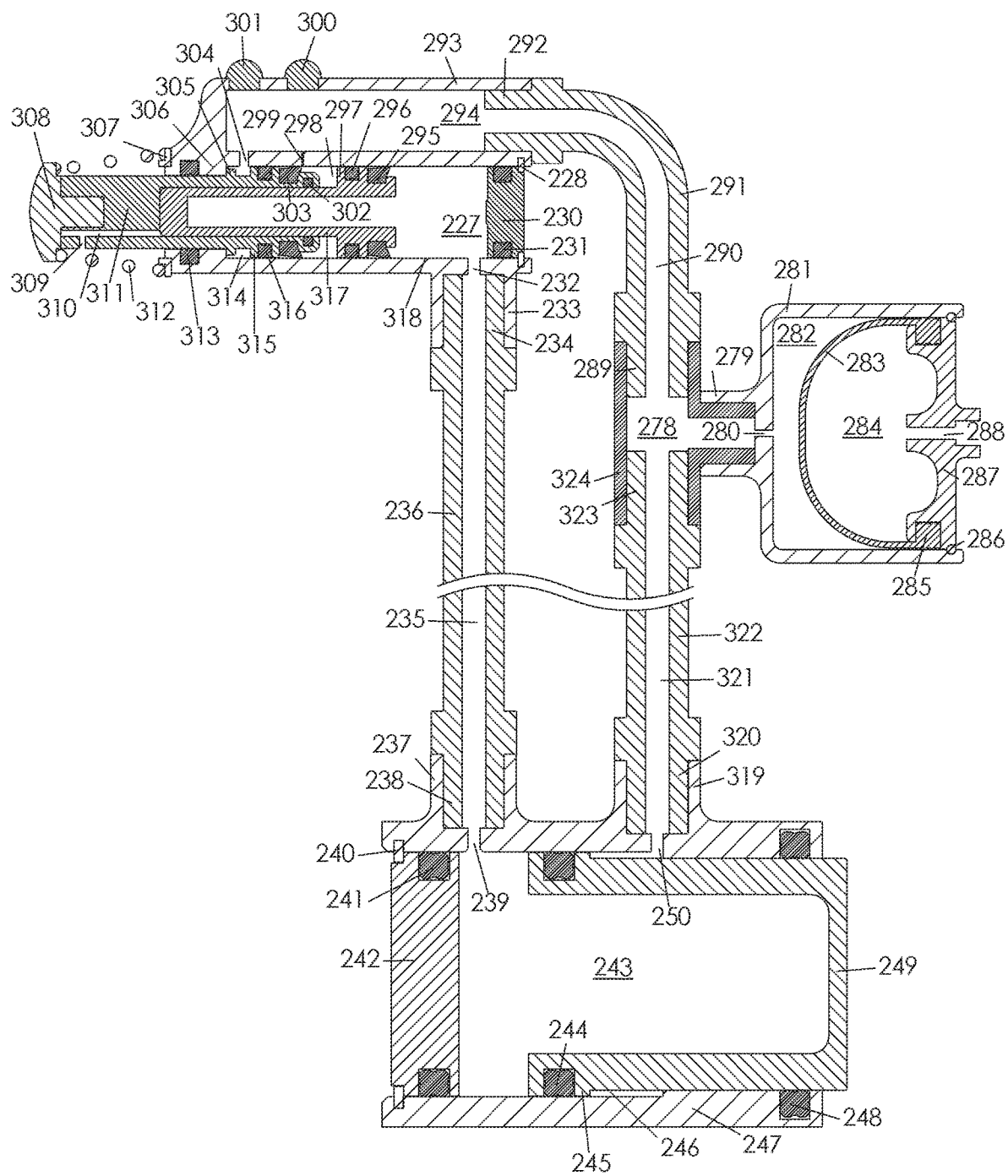
FIG. 11 shows a cutaway view of the system employing a shared reservoir between the primary and secondary chambers and a two-piece master plunger in the start/reloaded position.
Figure 12:
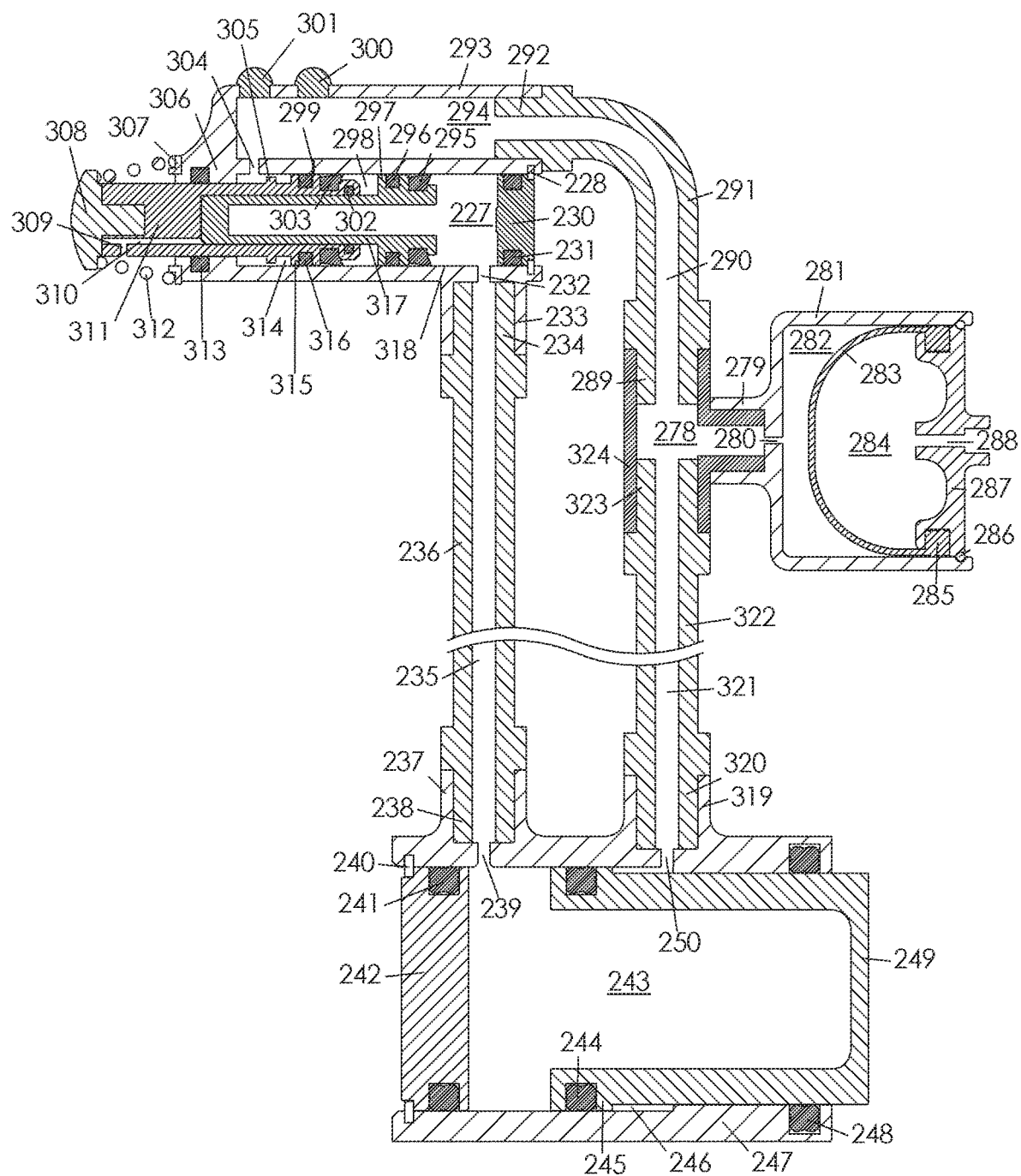
FIG. 12 shows another cutaway view of the system employing a shared reservoir between the primary and secondary chambers and a two-piece master plunger in a deployed position.
Figure 13:
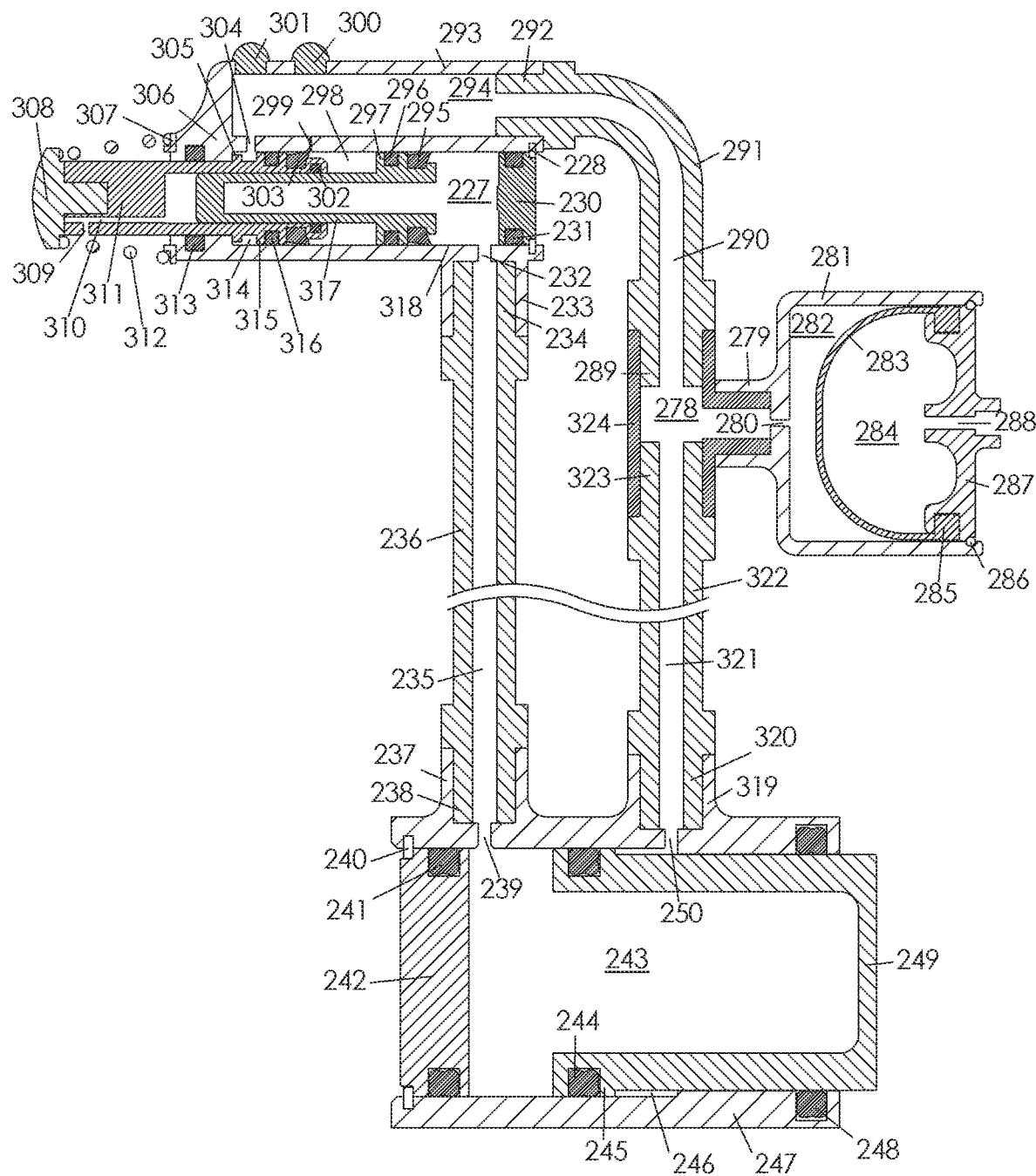
FIG. 13 shows another cutaway view of the system employing a shared reservoir between the primary and secondary chambers and a two-piece master plunger in a reloaded position and displaced slide piston accommodating the extended slave piston position due to normal friction pad wear.

FIGS. 11-13 illustrate embodiments of the braking system employing a single source of pressure, similar to those of FIGS. 1-3. In particular, FIG. 11 shows a master cylinder body 306 with a master tank 293 attached. The master plunger 311 and master slide plunger 317 are positioned in series within the preferably precision bore 318 of the master cylinder body 306, the master slide plunger 317 being inserted into the master plunger 311 in a free sliding manner. Sealing fluid communication between the primary chamber 314 and the compression chamber 298 is a high-pressure seal 316 and a cup seal 303. Sealing fluid communication between the compression chamber 298 and the master chamber 227 is a high-pressure seal 296 and a cup seal 295. Sealing fluid escape from the primary chamber 314 to the outside atmosphere is a high-pressure seal 313 in the master cylinder body 106 with the master plunger 311 running in a reciprocating manner within the inner circumference of the high-pressure seal 313. Sealing fluid escape from the compression chamber 298 to the outside atmosphere is a high-pressure seal 302 on the inside end of the master plunger head 315, with the master slide plunger 317 running within the high-pressure seal 302. The master chamber 227 is sealed from the outside atmosphere by a seal 231 around the outer circumference of the master cylinder plug 230 that is placed into the end of the master cylinder body 306 and retained by a suitable retention mechanism, such as a cir-clip 228. The master plunger 311 preferably is held in the fully extended position against an extension stop 305 to the master cylinder body 306 by a biasing mechanism, such as return spring 312. The return spring 312 locates on a spring seat 307 seated upon the master cylinder body 306 and retained by a retaining plug 308 that is attached to the end of the master plunger 311. Vent holes 309 and 310 vent the un-pressurized side of master slide plunger 317 to the outside atmosphere.

The remote reservoir 281 gives residence to a movable partition or wall or a flexible bladder 283 that through its movable or membrane-type properties separates the high-pressure gas atmosphere 284 from the brake fluid volume 282 captured likewise within the remote reservoir 281. A bladder cap 287 holds the bladder 283 in place and the captured large bladder rim 285 seals the outer and inner perimeters of bladder 283 from the outer atmosphere. The high pressure gas volume 284 is pressurized through the employment of a suitable (e.g., one way) valve 288 (not detailed). The high-pressure gas volume 284 pushes on the bladder 283 to then push on and pressurize the fluid volume 282. The bladder cap 287 is retained by a suitable retention mechanism, such as a cir-clip 286. The pressurized fluid volume 282 communicates through an orifice 280, into a small chamber 278 within the tee junction 324, through the hose center 290, into the master tank volume 294, through an orifice 304 to the primary chamber 314, applying pressure to the master plunger head 315, and through a refill orifice 299 to the compression chamber 298 applying pressure to the master slide plunger head 297. Simultaneously pressurized fluid passes from the small chamber 278 through the hose center 321 through the orifice 250 to the secondary chamber 246 to apply pressure to the slave plunger head 245.

The remote reservoir 281 connects to the tee junction 324 for example by a threaded female boss 279 (or may be formed as one). The tee junction 324 is connected to the high-pressure hose 322 for example by a male threaded boss 323 on the high-pressure hose 322. High-pressure hose 322 is connected to the slave cylinder for example by male threaded boss 320 and female threaded boss 319. The tee junction 324 is connected to the high-pressure hose 291 for example by a male threaded boss 289 on the high-pressure hose 291. The high-pressure hose 291 is connected to the master tank 293 for example by a male thread 292 on the end of the high-pressure hose 291.

Plugs 300 and 301 are placed in the master tank 293 for assembly bleeding and/or manufacturing purposes and may be threaded or solid press plugs, among other suitable connection mechanisms.

FIG. 12 shows the system in an actuated state where the master plunger 311 and master slide plunger 317 are pushed into the master cylinder body 306 consuming volume in the master chamber 227. The cup seal 303 covers the refill orifice 299 so communication between the compression chamber 298 and the master tank volume 294 is at least substantially or completely blocked. The compression chamber 298 fluid becomes a (at least substantial or theoretical) hydraulic solid and so pushes the master slide plunger 317. In the fully compressed position of the master slide plunger 317 (when little or no brake pad wear has yet occurred and the master slide plunger 317 is fully inserted into the master plunger 311) the master plunger 311 will mechanically push the slide plunger 317 as there is physical contact between the two parts. As the increased occupation of volume in the master chamber 227 must be displaced, the volume communicates through the orifice 232, through the brake line center 235, through the orifice 239 to the slave cylinder volume 243 to push the slave piston 249 against the brake pads (not shown).

The increased space created in the primary chamber 314, and the extension stop 305 is moved away from the master cylinder body 306, is filled by the fluid available in the master tank volume 294 as needed, which concurrently replenishes itself from the hose center 290, the small chamber 278 in the tee junction 324 and the brake fluid volume 282 in the remote reservoir 281. This movement of fluid to accommodate the space increase in the primary chamber 314 is ultimately provided by the expansion of the bladder 283 (or movement of the partition) and the high-pressure gas volume 284 into brake fluid volume 282.

Concurrently a small decrease in space within the secondary chamber 246 communicates its displacement through the orifice 250 in the slave cylinder body 247 to the high-pressure hose center 321. The areas behind the master slide plunger head 297 and the slave piston head 245 preferably are similar so pressures applied are likewise similar.

FIG. 13 shows the system in a reloaded/start position where the return spring 312 has pushed the retaining plug 308 that is connected to the master plunger 311 and preferably has drawn the master plunger 311 against its extension stop 305. As brake wear has occurred in this scenario, the slave piston 249 is more extended from the slave cylinder body 247 creating an increased internal volume. The master slide plunger 317 is free to slide within the master plunger 311 and as the refill orifice 299 is now exposed because the cup seal 303 is retracted with the master plunger 311, the compression chamber 298 may be expanded accordingly for the new volume requirements. The required fluid is incrementally supplied through refill orifice 299 to the compression chamber 298 as brake wear occurs.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present brake system has been described in the context of particularly preferred embodiments, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A pressurized brake system, comprising:
    a master cylinder at least partially defining a master chamber;
    a master plunger that slides within the master cylinder, the master plunger having a master plunger active face facing the master chamber and a master plunger pressure face opposite the master plunger active face;
    a reservoir housing at least partially defining a first reservoir chamber, wherein the first reservoir chamber is selectively put in fluid communication with the master chamber;
    a slave cylinder at least partially defining a slave chamber;
    a slave piston that slides within the slave cylinder, the slave piston having a slave piston active face facing the slave chamber and a slave piston pressure face opposite the slave piston active face, wherein the master chamber is in fluid communication with the slave chamber such that movement of the master plunger results in hydraulic movement of the slave piston;
    the reservoir housing further defining a second reservoir chamber, wherein fluid pressure from the second reservoir chamber acts on the master plunger pressure face of the master plunger and the slave piston pressure face of the slave piston;
    a movable wall between the first reservoir chamber and the second reservoir chamber such that pressure from the second reservoir chamber acts on the first reservoir chamber, wherein the movable wall has a first active area exposed to the first pressure chamber and a second active area exposed to the second reservoir chamber, wherein the first active area and the second active area are different in size.

2. The pressurized brake system of claim 1, further comprising a gas chamber containing a pressurized gas, wherein pressure from the gas chamber acts on the second reservoir chamber.

3. The pressurized brake system of claim 2, further comprising a valve communicating with the gas chamber that permits a pressure of the pressurized gas to be adjusted.

4. The pressurized brake system of claim 1, wherein the first active area is larger than the second active area.

5. The pressurized brake system of claim 1, wherein the reservoir housing is separate from the master cylinder.

6. The pressurized brake system of claim 1, wherein the reservoir housing is separate from the slave cylinder.

* * * * *